United States Patent [19]
Elliott

[11] Patent Number: 5,911,060
[45] Date of Patent: Jun. 8, 1999

[54] COMPUTER METHOD AND APPARATUS FOR UNFREEZING AN APPARENTLY FROZEN APPLICATION PROGRAM BEING EXECUTED UNDER CONTROL OF AN OPERATING SYSTEM

[75] Inventor: Scott Elliott, Beaverton, Oreg.

[73] Assignee: Symantec Corporation, Cupertino, Calif.

[21] Appl. No.: 08/937,629

[22] Filed: Sep. 26, 1997

[51] Int. Cl.[6] .................................................. G06F 9/455
[52] U.S. Cl. ..................... 395/500; 395/704; 395/706; 395/186; 395/591; 395/157; 395/183.14; 707/200
[58] Field of Search ..................... 395/704, 500, 395/706, 186; 707/200

[56] References Cited

U.S. PATENT DOCUMENTS

| | | | |
|---|---|---|---|
| 5,515,493 | 5/1996 | Boston et al. | 395/157 |
| 5,526,485 | 6/1996 | Brodsky | 395/183.14 |
| 5,815,702 | 9/1998 | Kannan et al. | 395/591 |

*Primary Examiner*—Kevin J. Teska
*Assistant Examiner*—Mark J. Fink
*Attorney, Agent, or Firm*—Fliesler, Dubb, Meyer & Lovejoy

[57] ABSTRACT

The invention provides an apparatus and computer method, generally referred to as ANTI-FREEZE™, for controlling the operation of a computer running under an operating system such as WINDOWS® 95 and WINDOW® NT operating system, or their like, for making responsive a program when that program becomes unresponsive to inputs from the keyboard and/or mouse. ANTI-FREEZE™ provides a user interface for the selection of an unresponsive program and then causes the operating system to send a message to the selected unresponsive program. If the selected unresponsive program responds to the message from the operating system, ANTI-FREEZE™ determines if the selected unresponsive program has any disabled windows and if so enabling a disabled window resulting in the selected unresponsive program to again become responsive. If the selected unresponsive program does not respond to the message from the operating system, ANTI-FREEZE™ modifies the selected unresponsive program to become responsive to messages sent from the operating system to the selected unresponsive program resulting in the selected unresponsive program to again become responsive.

18 Claims, 6 Drawing Sheets

COMPUTER METHOD AND APPARATUS FOR UNFREEZING AN APPARENTLY FROZEN APPLICATION PROGRAM BEING EXECUTED UNDER CONTROL OF AN OPERATING SYSTEM

BACKGROUND OF THE INVENTION

CROSS-REFERENCE TO RELATED PATENT APPLICATIONS

1) Patent application entitled "COMPUTER METHOD AND APPARATUS REQUIRING A ZERO FOOTPRINT IN A PROCESS FOR EXPANDING ALLOCATED MEMORY TO THE PROCESS," Ser. No. 08/823,675, filed on May 29, 1997, inventors Scott Elliott and John D. Teddy, assigned to the same assignee as this patent application, is hereby incorporated by reference in this patent application as if fully set forth in this application.

2) Patent application entitled "COMPUTER METHOD AND APPARATUS FOR ACCESSING AN APPLICATION PROGRAM AFTER THE APPLICATION PROGRAM HAS BECOME UNRESPONSIVE OR INCURRED A FATAL ERROR", Ser. No. 08/938,204, filed concurrently here, inventor Scott Elliott, assigned to the same assignee as this patent application, is hereby incorporated by reference in this patent application as if fully set forth in this application.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to a computer method and apparatus for unfreezing an apparently frozen application program being executed under control of an operating system. More particularly, the invention relates to a computer method and apparatus for regaining access to an application program which is unresponsive to user inputs such as from the keyboard and/or the mouse of the computer system executing the application program.

DESCRIPTION OF THE RELATED ART

There are instances when an application program running under the WINDOWS® 95 or WINDOWS® NT operating systems ceases to be responsive to user inputs such as from the keyboard and/or the mouse of a computer system. When this occurs, the application program is called frozen. Presently one of the few things that a user can do when this occurs is to call the "Close Program" function of the operating system by depressing the Ctrl+Alt+Del keys on the keyboard. This action will cause the operating system to display the "Close Program" dialog box which will include a list of all programs running under the operating system and will indicate whether any of the programs so listed are unresponsive. If the program marked unresponsive is not the apparent frozen application program on which the user experienced the problem, the user can select the unresponsive program and then select "end task" which will close that program. Of course by doing such any data not previously saved from within that unresponsive application program may be lost. The user can then close the Close Program dialog box thereby closing the Close Program function and then can ascertain whether or not the previously apparent frozen application is now unfrozen, that is, responsive to the keyboard and the mouse.

If the program marked unresponsive is the apparent frozen application program on which the user experienced the problem, the user can only select this application program and then select "end task" which will close that program. Of course by doing such any data not previously saved from within that apparently frozen and unresponsive program may be lost.

There are occasions where the "Closed Program" dialog box will not list any programs as being unresponsive after a user has experienced an application program not responding to the keyboard and/or mouse. Under this situation, the user can only select that application program and then select "end task" which will close that program. Of course by doing such any data not previously saved in that program will be lost.

SUMMARY OF THE INVENTION

It is an object of the present invention to provide a machine-implemented method and apparatus that can make an apparently-frozen application program responsive to user inputs such as from the keyboard and/or mouse after the application program becomes unresponsive to inputs from the keyboard and/or mouse without closing the application program running under WINDOWS® 95, WINDOW® NT and like operating systems.

Briefly the invention provides an apparatus and computer method for controlling the operation of a computer running under an operating system such as WINDOWS® 95 or WINDOWS® NT so as to make an unresponsive application program again responsive to user inputs such as from the keyboard and/or mouse of the computer system. A program, hereinafter referred to as Anti-Freeze™, is stored and installed in computer for the purpose of controlling the computer to operate in the desired manner. The installation procedure will establish an Anti-Freeze™ icon for calling the Anti-Freeze™ program. Once installed Anti-Freeze™ may be stored elsewhere than the computer memory.

If Anti-Freeze™ cannot be called by means of the icon, then the Close Program dialog box is called which will cause Anti-Freeze to add an Anti-Freeze button into the Close Program dialog box. The user then selects the the frozen program and clicks on the Anti-Freeze™ button. Anti-Freeze™ when called in this manner will initiate an AFHook routine for the selected program in the "close program" dialog box. AFHook will determine if the selected program is a WIN16 program and if so whether that WIN16 program is hard lock, that is not responding to messages from the operating system. AFHook will initiate a 16-Bit AddInstSet routine for a hard locked WIN16 program which will provide the user access to that WIN16 program such that the user may save the data and exit that WIN16 program. In all other cases AFHook will cause ANTI-Freeze to enter into the AFGeneral routine.

When Anti-Freeze™ is called by the icon (or equivalent means), an AFApp routine will display an Anti-Freeze™ dialog box. The user selects the frozen application from a Anti-Freeze™ dialog box and clicks on the unfreeze button in the Anti-Freeze™ dialog box which will initiate an AFGeneral routine.

AFGeneral will determine if the selected application program is soft locked (that is responsive to messages from the operating system) or hard locked (unresponsive to messages from the operating system).

Where the selected application program is soft locked an AFSoft routine is initiated. AFSoft determines if any of the windows of the selected application program are disabled and if so then enables one or more of the disabled windows such that the selected application program becomes unfrozen (that is becomes responsive to the keyboard and mouse). If all the windows for the selected program are enabled, a message is displayed informing the user that Anti-Freeze™ can do nothing more.

Where the selected application program is hard locked, an AFHard routine is initiated as the "debugger" for the selected application and the selected application program is stopped. AFHard routine first initiates a Stack trace routine, which includes a WalkStack routine and a ScanStack routine, which if successful will reset the application program such that the selected application program becomes responsive (unfrozen) to user input such as from the keyboard and/or mouse. If Stack trace is unsuccessful, then AFHard initiates a 32-BIT AddInstSet routine which will provide the user access to the selected application program such that the user may save the data and exit that application program.

An advantage of the invention is that Anti-Freeze™ regains control over an application program which is not responding to inputs from the keyboard and/or the mouse such that the user may avoid losing application data that had not been previously stored to nonvolatile memory prior to the application program becoming unresponsive to the inputs from the keyboard and/or the mouse.

BRIEF DESCRIPTION OF THE DRAWINGS

The invention will be described with respect to the particular embodiments thereof and references will be made to the drawings, in which.

DETAILED DESCRIPTION OF THE INVENTION

Figure 1:
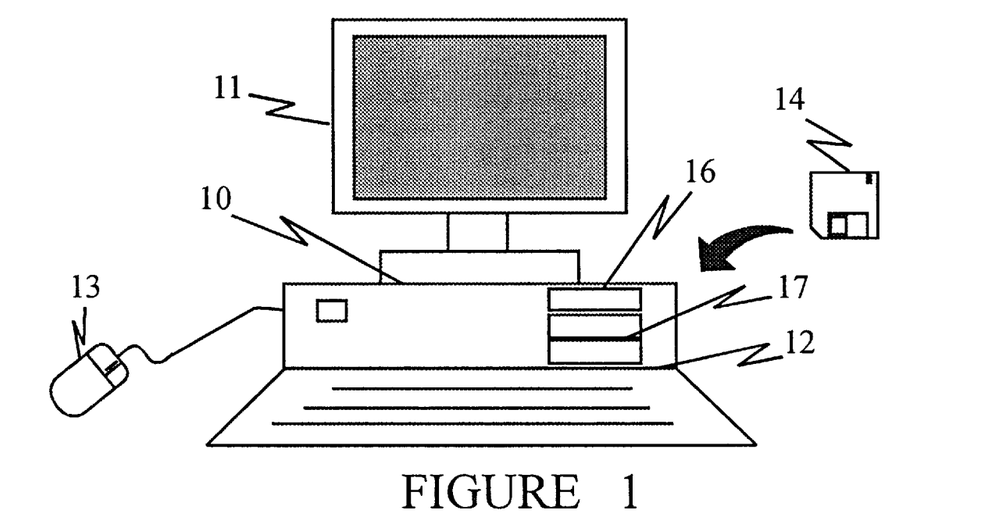
FIG. 1 illustrates a computer system embodying the present invention.
Figure 2:
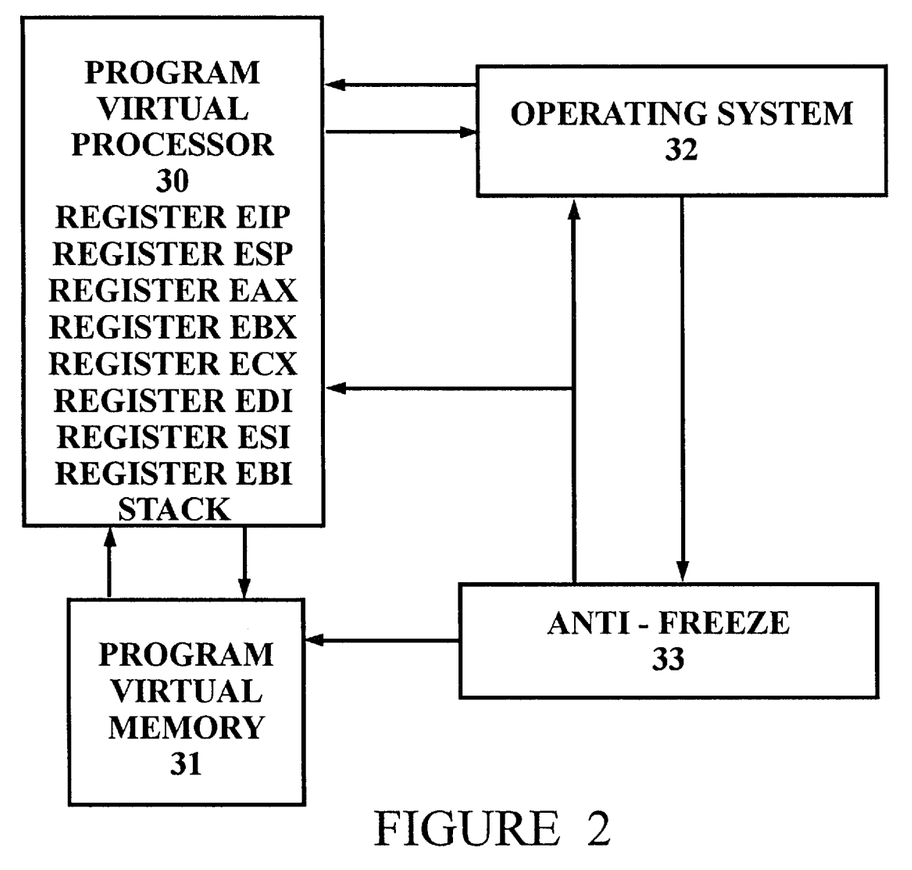
FIG. 2 is an illustration showing the interaction between the operating system, the program's virtual processor and memory and Anti-Freeze™.

Referring to FIGS. 1 and 2, a computer system is shown comprised of a mouse 13, a display 11, a keyboard 12 and a computer 10. Computer 10 includes a floppy disk drive 16, a hard disk drive 17 and a random access memory 15 (not shown in FIG. 1). The computer 10 is operating under the control of WINDOW® 95 or WINDOWS® NT or a like multi-tasking operating system 32 (hereinafter referred to as operating system 32). The functions referred to herein are WINDOWS® 95 or WINDOWS® NT operating system functions. Under the architecture of operating system 32, a program is allocated memory space in memory 15 referred to as a virtual memory 30. Further to allow multiprocessing of programs, resources are allocated to a program which are referred to as a virtual processor 30. The virtual processor 30 includes a series of programmable registers, including but not limited to programmable registers commonly referred to as EIP, ESP, EAX, EBX, ECX, EDI, ESI and EBI which are used by the operating system 32 in executing the program. The state of the programmable registers is commonly referred to as the context of the program or the program's context.

An application program running under operating system 32 may become unresponsive to inputs such as from the keyboard and/or mouse because the application program has wrongly executed a function, has branched into a program that stops it from accepting input from the user or is attempting to execute a function which it either cannot complete or cannot complete in a reasonable amount of time. When this occurs, the application program is said to be frozen and is unresponsive to keyboard strokes or mouse clicks. A frozen application program can result in the operating system being also non responsive to keyboard strokes or mouse clicks.

Disk 14 is a magnetic disk widely used in the computer industry to store programs and data. Disk 14 has recorded thereon a program, hereinafter referred to as Anti-Freeze™ 33. When disk 14 is inserted into floppy disk drive 16, computer 10 has the ability to coact with Anti-Freeze 33 stored upon disk 14 so as to control the operation of computer 10. Computer 10 may transfer Anti-Freeze™ 33 to hard disk drive 17 or into the random access memory (RAM) 15 of computer 10 thereby allowing disk 14 to be removed from the floppy disk drive 16.

While Anti-Freeze 33 was described as being recorded upon a floppy disk, AntiFreeze 33 may be recorded onto any recording medium ( i.e. magnetic tape, magnetic cards, optical disc, optical tape, optical cards, flash memory units, semiconductor memories) that may be used as a input medium to a computer system running under the operating system 32.

The principal elements of the Anti-Freeze architecture are:

AFHook—A routine which is established as an extension to the Close Program dialog box which appears when the user presses ctrl+alt+del under operating system 32 and which contains a 16-bit AddInstSet routine for use with Win16 programs.

AFApp—A routine that provides a mechanism by which the user can chose which program the user thinks is frozen and submit it an AFGeneral routine. The AFApp accepts input from the AFHook so as to skip directly to AFGeneral.

AFGeneral—A routine that selects either AFSoft or AFHard by analyzing a frozen program to determine which routine is required.

AFSoft—A routine for fixing a soft-locked program. A soft-locked program is a program whose internal processing is functioning normally, but which has its user-interfaces disabled. AFSoft attempts to enable the user-interface thereby returning the program to normal.

AFHard—A routine for fixing a hard-locked program. A hard-locked program is a program which does not respond to messages from the operating system 32. This routine chooses between several subroutines for discontinuing the current operation of the hard-locked program and forcing the program to start processing its messages again.

I CALLING ANTI-FREEZE

Figure 3:
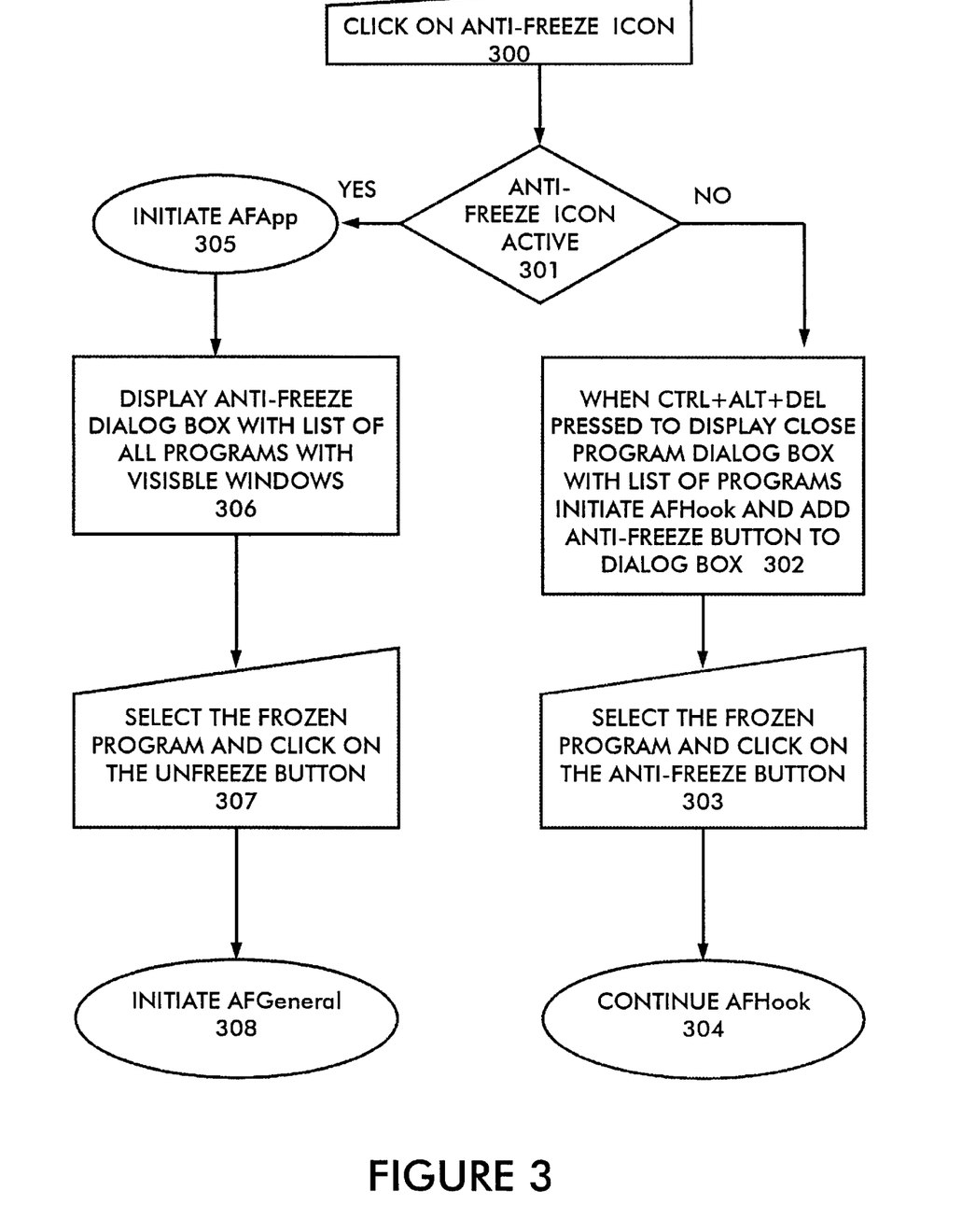
FIG. 3 is a flow chart illustrating the process for initiating Anti-Freeze™ and specifically including AFApp and part of AFHook.

Referring to FIG. 3, when an application program becomes unresponsive the user, in step 300, will first attempt to initiate Anti-Freeze 33 by clicking upon the Anti-Freeze icon (or will select Anti-Freeze 33 through the Start Menu of operating system 32) which will initiate AFApp. If the operating system itself has become unresponsive to keyboard stokes or mouse clicks, then Anti-Freeze 33 can not be called by step 300. The user passes through step 301 to step 302 where the user depresses the Ctrl+Alt+Del keys to display the Close Program dialog box of operating system 32. AFHook also responds to the depression of Ctrl+Alt+Del keys and adds an Anti-Freeze™ button to the Close Program dialog box. The user, in step 303, then selects the application program shown to be unresponsive in the dialog box or, if no application program is marked as unresponsive, the application program that the user was executing when the application program became unresponsive. The user, in step 303, then clicks on the Anti-Freeze™ button in the Close Program dialog box which will in step 304 continue the processing of AFHook.

II AFA

Still referring to FIG. 3, when Anti-Freeze 33 is called in step 300, then, in step 305, AFApp is initiated. AFApp, in step 306, will display an Anti-Freeze dialog box and will list all open programs running under operating system 32. The user in step 307 selects the application program that was being executed when the application program became unresponsive and clicks upon the Unfreeze button in the dialog box which will, in step 308, initiate AFGeneral.

Alternatively, AFApp can test each running program in step 306, for responsiveness and mark any unresponsive program. This allows the user to select the marked unresponsive program, in step 307, even if the marked unresponsive program was not the program being used by the user when the program being used by the user became unresponsive. This can be done because it is possible for a program running in the background to cause the program being run in the foreground to appear to be unresponsive. By attempting to first cure a program marked as unresponsive, even thought the program so marked was not the foreground program, all unresponsive problems with regards to all application programs may be solved.

III AFHook

A hard-locked Win16 program can prevent the AFApp from working but does not interfere with the processing of functions associated with the Close Program dialog box of operating system 32.

Figure 4:
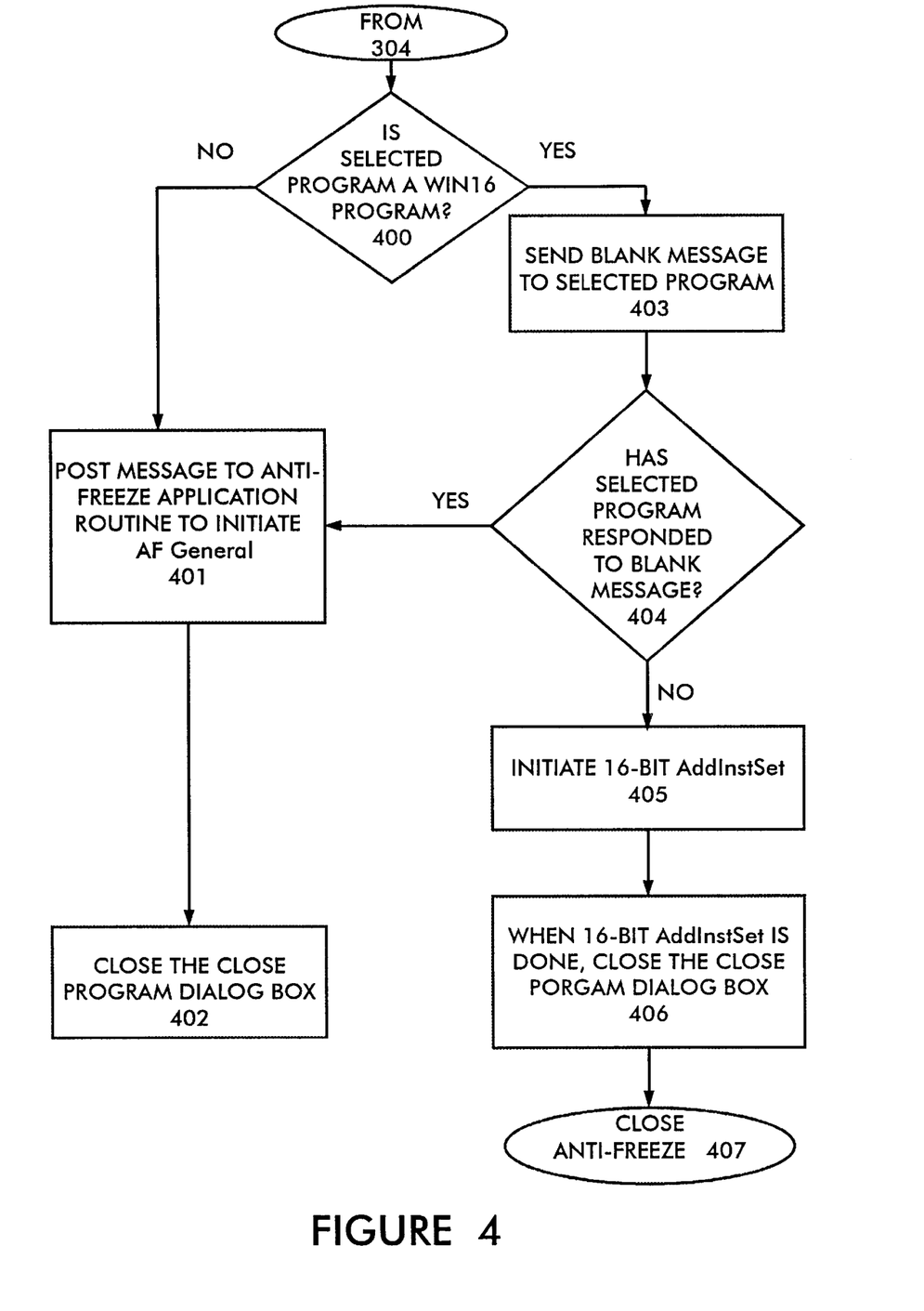
FIG. 4 is a flow chart illustrating AFHook.

Referring to FIG. 4, AFHook is continued from step 304 of FIG. 3. The user has selected a program from the Close Program dialog box and has clicked on the AntiFreeze button in the Close Program dialog box.

Referring to FIG. 4, the selected program is first tested, in step 400, to determine if the selected program is a Win16 program. If the selected program is not a Win16 program, AFHook, in step 401, posts a message to AFApp to initiate AFGeneral and closes the Program Dialog box. If the selected program is a Win16 program, AFHook, in step 403, causes a blank message to be sent by operating system 32 to the selected program. AFHook then monitors the selected program to ascertain if the selected program responded to the blank message. If the selected program has responded then the selected program is deemed to be soft-locked in step 404 and AFHook branches to step 401 which posts a message to AFApp to initiate AFGeneral and closes the Close Program dialog box.

AFHook is applicable to Windows 95, where a single errant Win16 program can freeze the entire system. Under Windows NT, a non-responsive Win16 program will only interfere in the functioning of other Win16 programs, and won't disturb AFApp because it's a Win32 program. Hence, there is no need for AFHook under Windows NT. The description will hereinafter be directed to a Windows 95 and it is within the skill of the art to modify the architecture of Anti-Freeze for Windows 95 to be used in Windows NT.

While the Close Program dialog box is visible, all other programs are stopped. AFHook always closes the Close Program dialog box when AFHook is done such that other programs can resume operation.

Where the selected program does not respond, in step 404, to the blank message, the Win16 program is hard-locked. AFHook must initiate, in step 405, a 16-bit AddInstSet routine immediately, since no other program will function until the problem is corrected. When the 16-bit AddInstSet routine is completed, AFHook closes the Close Program dialog box, in step 406, and closes Anti-Freeze 33 in step 407.

IV 16-BIT AddInstSet ROUTINE

Operating system 32 delegates an area of memory space in which all Win16 programs run. When the computer starts, Anti-Freeze installs a 16 bit routine containing a message-dispatch function into the designated Win16 memory space. Anti-freeze stores the address of the message-dispatch function using the SetWindowLong function. The address of the message-dispatch loop is obtained by calling GetWindowLong.

The 16 Bit AddInstSet routine executes the following:
1) Establish location of a substitute message-dispatch function in the Win16 memory space for the selected program by:
   a) Call GetWindowLong to retrieve the address of the 16-bit message-dispatch function.
2) Change the context of the selected program's virtual processor such that the selected program will start executing the message-dispatch function by:
   a) Read the Ring-O-Thread-Control-Block (a special handle) from the undocumented thread database structure associated with the specified 16-bit program. This entails:
      i) Get the program's thread ID by calling GetWindowProcessThreadId. p3 ii) The thread ID points to an undocumented structure. The Ring-O-Thread-Control-Block is located 92 bytes into this structure.
   b) Call VMM.VxD (the core system device driver), using the Ring-O-Thread-Control-Block. This can be accomplished by calling a service called VWIN32/GetThreadContext, which retrieves the same context structure as step 3(a) of the 32-Bit AddInstSet routine (discussed below).
   c) Change the IP and CS registers to the address of the message-dispatch function from step 2. Here two registers are changed because the address of the message-dispatch function is a 32-bit quantity, but the IP register holds only 16 bits in a 16-bit program, and the other 16 bits of the address must be recorded in the CS register. Under 32-bit programs, the EIP register can hold the entire 32-bit address.
   d) Store the modified context structure by calling a VMM service called VWIN32/SetThreadContext.
3) Start the selected program which will provide the user with an opportunity to save and exit the selected program.

V AFGeneral

At this point in time, AFGeneral has been initiated by AFApp in response to step 308 of FIG. 3 or step 401 of FIG. 4. AFGeneral is a routine that selects either AFSoft or AFHard by analyzing the selected program to determine which routine is required.

Figure 5:
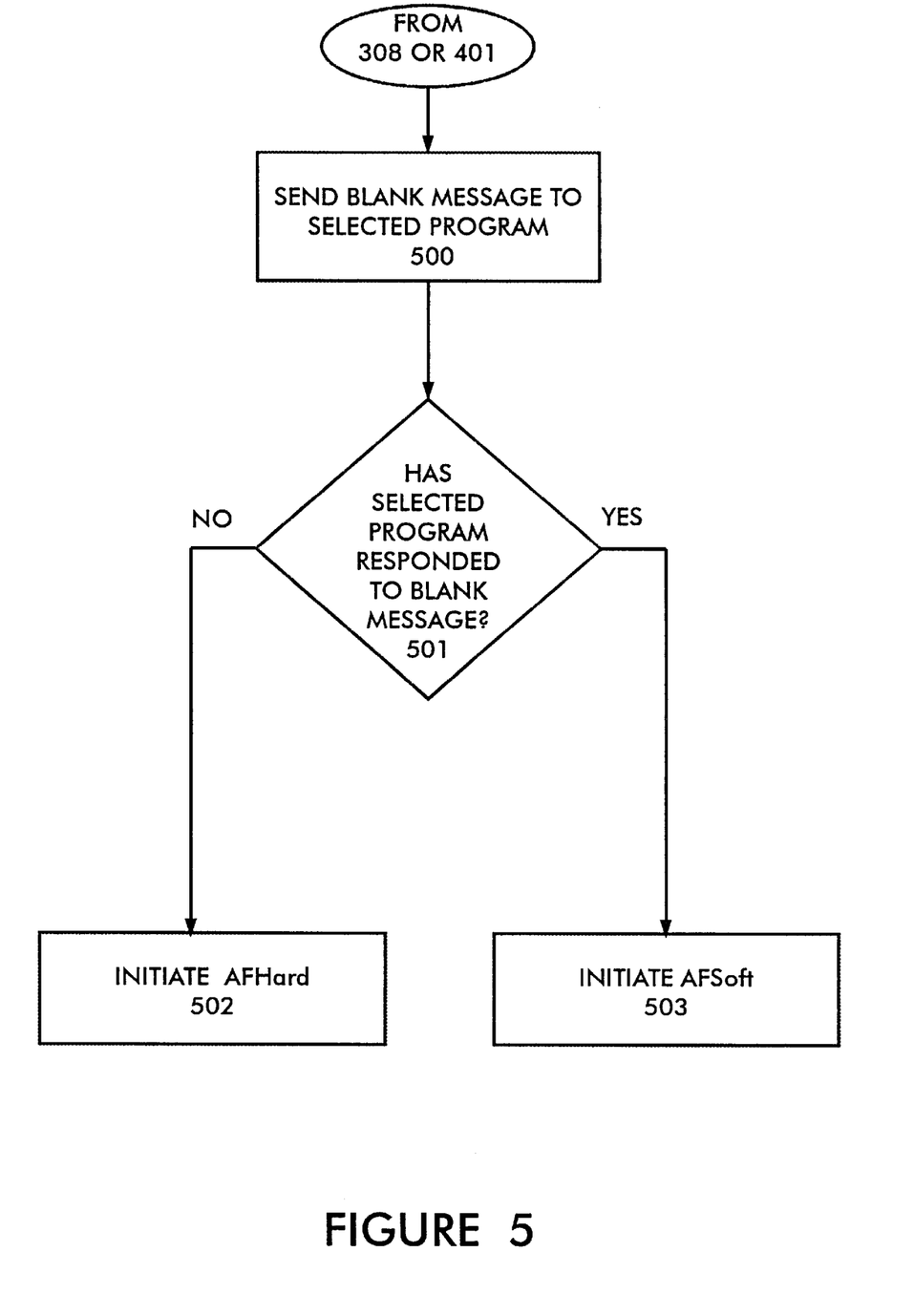
FIG. 5 is a flow chart illustrating AFGeneral.

Referring to FIG. 5, AFGeneral at step 500 causes a blank message to be sent by operating system 32 to the selected program. AFGeneral then monitors the selected program, in step 501, to ascertain if the selected program responded to the blank message. If the selected program has responded then the selected program is soft-locked and AFGeneral branches to step 503 and initiate AFSoft. If the selected program has not responded then the selected program is hard-locked and AFGeneral branches to step 502 and initiate AFHard.

VI AFSoft

AFSoft is a routine for fixing soft-locked programs. A soft locked program is a program whose internal processing is functioning normally, but which has the user-interfaces disabled.

Figure 6:
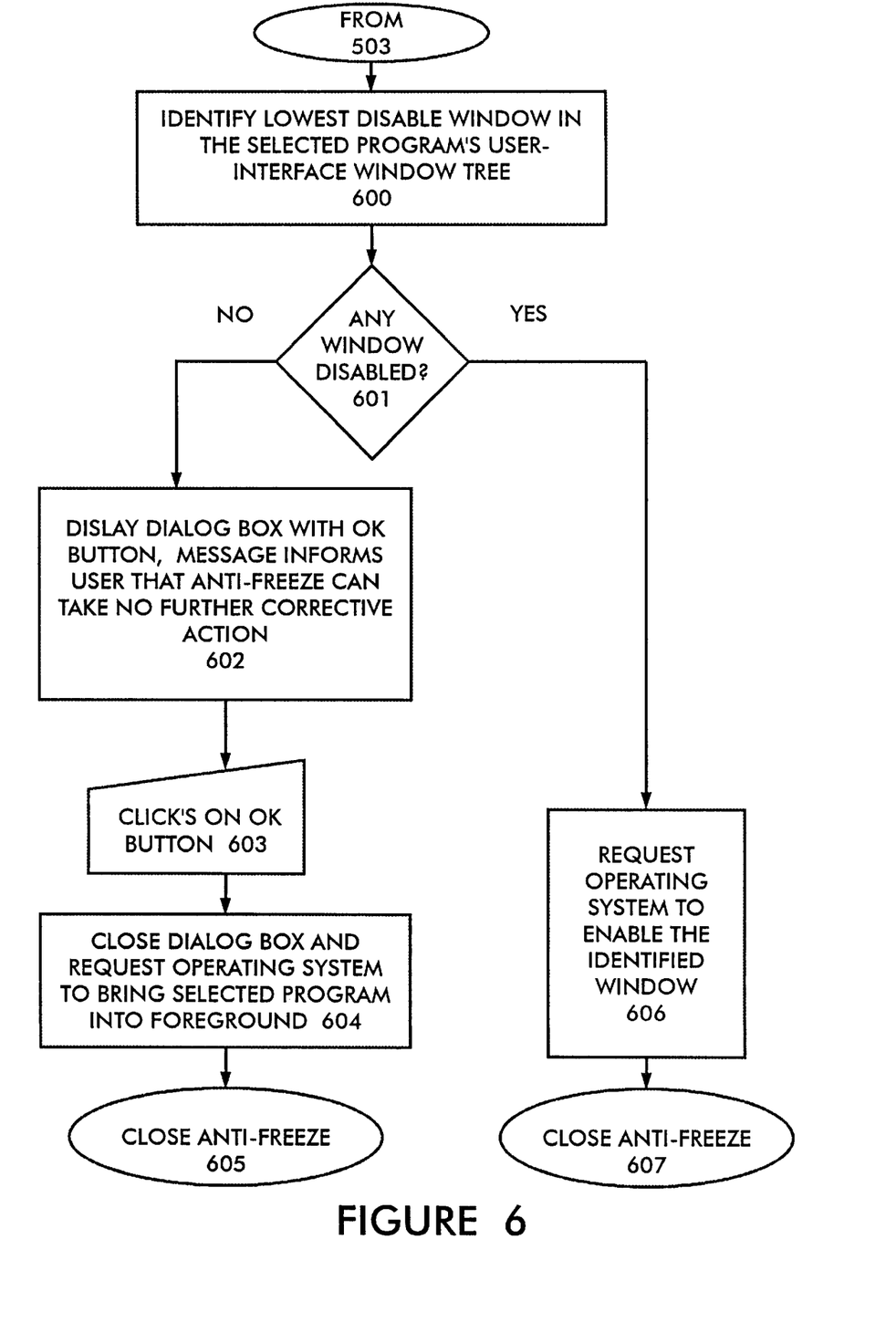
FIG. 6 is a flow chart illustrating AFSoft.

Referring to FIG. 6, AFSoft, in step 600, scans all the selected program's user-interface windows to see if any user-interface windows are disabled. AFSoft calls the Enum-Windows function of operating system 32 with direction to call a subroutine of AFSoft. This subroutine is called for each user-interface window and interrogates that window to ascertain if the window is disabled by use of the IsWindowEnabled function. For the first window found to be disabled, AFSoft stores the identity of that window. For each succeeding window found disabled, the subroutine determines if that subsequent disabled window is lower on the window tree for the selected program then the identity of the disabled window previously stored by AFSoft and if so stores that subsequent window's identity in place of the previously stored disabled window identity. When the subroutine has been run for all windows found in response to the EnumWindow function, AFSoft will have store the identity of the disabled window that was lowest on the window tree for the selected program. Alternatively, AFSoft can have a subroutine that make a list of the identity of all disabled windows.

If AFSoft has found a disabled window, then in step 601 AFSoft branches to step 606. In step 606, AFSoft request operating system 32 to enable the window whose identity AFSoft's subroutine has stored. Where alternatively, AFSoft made a list of all disabled windows, then in step 606, AFSoft request the operating system 32 to enable all of the disabled windows in the list.

Alternatively, AFSoft's subroutine in step 600 could request operating system 32 to enable each window found to be disenable when first found which would remove the need for step 606.

AFSoft then closes Anti-Freeze in step 608.

If no disable window was found in step 600, then AFSoft would branch in step 601 to step 602. AFSoft in step 602 displays a dialog box which informs the user that Anti-Freeze can take no further corrective action. The dialog box has an OK button which upon being clicked upon by the user in step 603 signals AFSoft, in step 604, to close the dialog box and request operating system 32 to bring the selected program into the foreground. AFSoft then closes Anti-Freeze in step 605.

VII AFHard

AFHard is a routine for fixing a hard-locked program. A hard-locked program is a program which does not respond to messages from the operating system 32. This routine chooses between several subroutines each of which discontinues the current operation of the hard-locked program and forcing the program to start processing messages again. The subroutines are a 32-Bit AddInstSet routine and a Stack trace routine.

Figure 7:
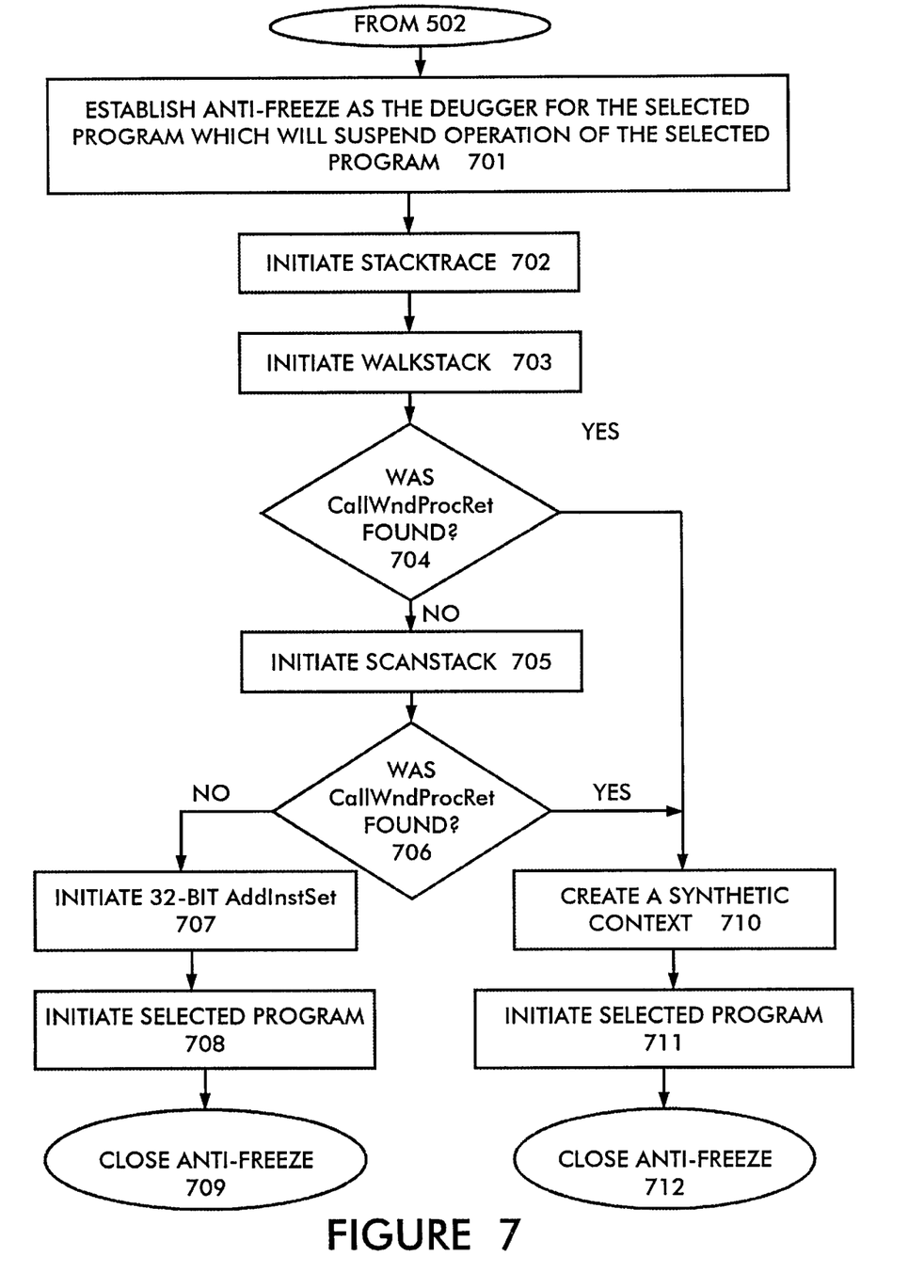
FIG. 7 is a flow chart illustrating AFHard.

Referring to FIG. 7, AFHard, in step 701 first establishes AFHard as the debugger for the selected program by calling DebugActiveProcess to take control of the selected program. The selected program is automatically suspended when the debugger thread is running. AFHard, in step 702, initiates the Stack trace routine which ascertain parameters for the CallWndProc function and then incites WalkStack (describe in detail below) in step 702 to find the location in the stack of the return address for the CallWndProc function. If WalkStack was found unsuccessful in step 704, then Stack trace initiates ScanStack (described in detail below) in step 705 to find the location in the stack of the return address for the CallWndProc function. If ScanStack was found unsuccessful in step 706, then Stack trace is exited and AFSoft initiates the 32-Bit AddInstSet routine (described in detail below) in step 707.

If either ScanStack or WalkStack was successful then Stack trace creates a synthetic context (described in detail below) in step 710 for the selected program such that the selected program when initiated will continue as if the function that was being processed when the selected program became unresponsive was successfully completed. The selected program is restarted in step 711 and Anti-freeze is closed in step 712.

The 32-bit AddInstSet routine, in step 707, adds memory to the virtual memory space for the selected program and then establishes a message dispatch loop in the selected program added memory space and then have the selected program to be reinitiated so as to execute a new message dispatch loop which will allow the user to save the data of the selected program and then exit the selected program. The selected program is then started so as to immediately process the message dispatch loop in step 708 and Anti-freeze is closed in step 709.

VIII 32-BIT AddInstSet ROUTINE

The 32 Bit AddInstSet routine executes the following:

1) If not debugger, call DebugActiveProcess to take control of the selected program which will automatically suspend the selected program when the debugger thread is running.
2) Establish message-dispatch loop in the selected program's virtual processor and virtual memory by:
   a) Allocate memory in the virtual memory by:
      i) Replace first 11-bytes of selected program with an 11-byte function to allocate memory.
      ii) Briefly restart the selected program, just long enough for it to allocate the memory.
      iii) Record the address of the new memory and restore the original contents of the selected program's first 11 bytes.
   b) Copy a message-dispatch loop function into newly allocated virtual memory for the selected program. One message-dispatch loop function that will restore a degree of control over the selected program so as to allow the user to save the program and exit is as follows:
Get Message User selects function by keyboard or mouse such as SAVE or SAVE AS Translate Message Translates key pressed into character message Dispatch Message System performs requested function Exit Process End routine
3) Change the context of the selected programs virtual processor to start executing in the message-dispatch loop by:
   a) Read the values of the selected program's registers into a context structure using GetThreadContext.
   b) Change the EIP register's value to the first address of the newly allocated virtual memory.
   c) Store the context structure back into the selected program's registers using SetThreadContext.

4) Explicitly resume the program by calling ContinueDebugEvent.

IX Stack trace ROUTINE

A} Background: How the Stack operates during a function call

This is an example of how a piece of a program's stack might look when it decides to place a call to a function which we will call TargetFunc. Arbitrarily assume that the TargetFunc is a Window-procedure, the type of function Anti-Freeze investigates. A Window-procedure is a sort of "gateway" function, through which all the messages directed to a particular window will pass. This type of function receives four parameters: a handle identifying the window to which the message is being sent, an identifier which explains what the message is (for example, the window may be asked to draw itself on the screen), and two general purpose parameters which can contain more details about the message( such as describing what region to draw).

| 48 ... |
|---|
| 47 |
| 46 |
| 45 |
| 44 |
| 43 |
| 42 |
| 41 ... (SP/ESP points here) |

Assume that the program's stack pointer, called ESP and stored in the ESP register, is pointing to cell #41 when the program starts to place a function call. A double-border indicate where ESP is pointing. The actual contents of cell #41 are irrelevant at this point for it is merely the last item which was piled on the stack.

Since TargetFunc is a Window-procedure, it requires four input parameters. Before calling TargetFunc, the program must push those parameters onto the stack and uses the PUSH instruction, which automatically increments ESP to a new location and then stores a value in that cell.

The following four stacks show the four parameters being entered into the stack:

| 48 |
|---|
| 47 |
| 46 |
| 45 |
| 44 |
| 43 |
| 42 Parameter 4 (1Param) |
| 41 ... |

Next:

| 48 |
|---|
| 47 |
| 46 |
| 45 |
| 44 |
| 43 Parameter 3 (wParam) |
| 42 Parameter 4 (1Param) |
| 41 ... |

Next:

| 48 |
|---|
| 47 |
| 46 |
| 45 |
| 44 Parameter 2 (Message ID) |
| 43 Parameter 3 (wParam) |
| 42 Parameter 4 (1Param) |
| 41 ... |

Then:

| 48 |
|---|
| 47 |
| 46 |
| 45 Parameter 1(Window Handle) |
| 44 Parameter 2 (Message ID) |
| 43 Parameter 3 (wParam) |
| 42 Parameter 4 (1Param) |
| 41 ... |

Now that all the parameters have been recorded onto the stack, the program places a call to the TargetFunc function. The act of calling the function automatically records a return address, telling where the function was called from, onto the stack.

The stack would now contain:

| 48 |
|---|
| 47 |
| 46 Function's Return Address |
| 45 Parameter 1(Window Handle) |
| 44 Parameter 2 (Message ID) |
| 43 Parameter 3 (wParam) |
| 42 Parameter 4 (1Param) |
| 41 ... |

It is standard practice in C/C++ and Pascal programs for each function to declare a stack frame immediately. Assuming TargetFunc follows this convention, it immediately pushes the old EBP value stored in register EBP onto the stack.

The stack now contains:

| 48 |
|---|
| 47 Stored BP/EBP |
| 46 Function's Return Address |
| 45 Parameter 1(Window Handle) |
| 44 Parameter 2 (Message ID) |
| 43 Parameter 3 (wParam) |
| 42 Parameter 4 (1Param) |
| 41 ... |

Since the contents of the EBP register has been stored on the stack, the program can now store a new value in EBP register and later retrieve the old value from stack cell #47 and rewrite the old value into the EBP register. Standard practice calls for the program to copy ESP value stored in the ESP register( the cell address in which the EBP value has been stored) into the EBP register and then increment ESP value, the ESP value is always stored in the ESP register, to skip as many entries as the function wants for its temporary use. If TargetFunc requires ten entries for its local storage, for example, it will add 10 to ESP so it points at cell #57 (not shown). This reserves cells #48 through #57 free for the function's personal use. Since the EBP register will now point to a location in between the program's temporary storage area and its parameters, system can access these cells relative to address stored in the EBP register. For example, the function's first variable would be stored in cell #(EBP+1) and its first parameter would be in cell #(EBP-2). Therefore the function does not have to be compiled with any knowledge of the actual locations on the stack rather it accesses all short-term data by adding or subtracting from the address stored in the EBP register.

Because the ESP value in the ESP register now points to cell #57 any additional data pushed onto the stack will start with the next cell after the one indicated by ESP: cell #58. This reserves cells #48 through #57 for the function's use and these cells are referred to as the function's "stack frame". Any function called by this function is responsible for preserving the values of EBP and ESP for the calling function.

When TargetFunc is done, it is responsible for restoring ESP and EBP registers to the values the caller had originally. To accomplish this, it copies the EBP register back into ESP register so that ESP again points at cell #47, thereby un-reserving the function's stack frame. Then it "pops" the contents of cell #47 back into EBP register, thereby decrementing ESP to point at cell #46.

The stack now contains:

| 48 |
|---|
| 47 |
| 46 Function's Return Address |
| 45 Parameter 1(Window Handle) |
| 44 Parameter 2 (Message ID) |
| 43 Parameter 3 (wParam) |
| 42 Parameter 4 (1Param) |
| 41 ... |

The EBP register has now been restored to its original value. Since ESP points at the return address, TargetFunc can execute a RET (return) instruction to pop the return address off the stack and resume executing at that address. That would, however, leave the four parameter values on the stack, so the function uses a special variant of the RET instruction which instructs the microprocessor to also pop additional items off the stack. TargetFunc knows it was designed to receive four parameters, so it executes a RET 4 to pop 4 items off the stack in addition to the return address. This causes the microprocessor to first pop cell #46 off the stack, then four additional items, cells 45 through 42, finishing with ESP value in the ESP register pointing to cell #41 as it started out.

The stack now contains:

| 48 ... |
|---|
| 47 |
| 46 |
| 45 |
| 44 |
| 43 |
| 42 |
| 41 ... (SP/ESP points here) |

This description applies to functions written using the Pascal calling convention, where a function is responsible for cleaning its parameters off the stack even though the calling program put them there. Other calling conventions exist, but those are not relevant to this discussion because Window-procedures must be written using Pascal conventions. Anti-Freeze only deals with calls to Window-procedures, so Anti-freeze can ignore any other function calls recorded on the stack.

For simplicity, the term "cell" has been used to describe stack entries as atomic units. In actual practice, each "cell" can be 2 or 4 bytes in size. A 32-bit program uses 4-byte cells and a 16-bit program uses 2-byte cells. If a 16-bit program needs to store 32-bit values, which would require 4 bytes, it merely stores it into 2 adjacent cells. Although this does not materially change the behavior described here, it does alter the numbering scheme, for example, to reserve 10 "cells" on the stack, the TargetFunc function would actually have to increment ESP by 40 bytes if it was written as a 32-bit program.

B} What Stack trace does

Assuming Stack Trace can identify which stack cell would be used when the program would eventually return from its window-procedure, the context of the virtual processor could synthetically be re-created. In the example, that return address is recorded in cell #46.

In designing Windows 95, Micro Soft dictated that a program's window-procedure could only be called by a special system function, CallWndProc. Even if a program wanted to directly call its own window-procedure, it must ask CallWndProc to place the call. Because there is only one piece of code that will ever call any program's window-procedure, every window-procedure called will return to that same address when it finishes. In other words, cell #46 must return to the CallWndProc function.

If Stack trace can discover what the return address from a particular window-procedure call, then Stack trace will know the return address of every window-procedure call. To determine this address, Stack trace's first window-procedure, upon being called, immediately looks at its own stack and ascertains the return address for the CallWndProc function and records the value as CallWndProcRet. Antifreeze also determines the size of CallWndProc's stack frame and records that value as CallWinProcSize for later use.

The arithmetic in these functions may be a bit confusing because, under Intel-type microprocessors, the bottom of the program's stack is stored at a higher address than the top. Consequently, a program's stack starts at a high memory address and decrements by four for each storage cell (each cell occupies four bytes). Despite the backward numbering scheme, decreasing addresses are still referred to as "up" and the lowest address is still "the top."

When Stack trace first begins executing, it immediately creates a window. The window-procedure associated with this window immediately executes the following statements to record information about the system:

```
{
    DWORD     dwCallWndProcRet;
    DWORD     dwStackFrameSize;
    // get the return address
    _asm
    {
        mov    eax, [ebp+4]            ; Get return address
                                        from stack
        mov    dwCallWndProcRet,eax    ; Store it
        mov    eax, [ebp]              ; Get the prior value
                                        of EBP
        lea    ebx, [ebp+4]            ; Get location of
                                        return address
        sub    eax, ebx                ; Calculate the
                                        difference
        mov    dwStackFrameSize,eax    ; Store it as the
                                        stack frame
    }
    // store it
    g_JitData.dwWndProcRet = dwCallWndProcRet;
    g_JitData.dwStackFrameSize = dwStackFrameSize;
}
```

This excerpt, written partly in assembler, looks back on the stack to find out where it was called from and saves this value in the dwCallWndProcRet variable. As discussed earlier, all 32-bit window-procedures in the system get called the same way, so they will all return to the same address. The code then calculates the distance between the stack cell which stores dwCallWndProcRet and the stack cell which contains the EBP value for the previous stack frame. This determines how far WalkStack will have to look back during the "overshoot and look back" procedure. The excerpt concludes by copying the results into a global data structure called g_JitData.

When called, Stack Trace recalls the value of CallWndProcRet and searches for that value on the selected program's stack. The preferred way to do this is to walk the selected program's stack in an orderly fashion by the WalkStack routine and if that fails then to scan the stack by the ScanStack routine.

C) WalkStack Routine

By walking the selected program's stack, WalkStack works backwards from the selected program's current state to find the most recent location where its windowprocedure was called. It does this by working backward through a program's stack frames. Although standard practice in debugging tools, walking stack frames is considered an extremely advanced skill. In standard practice, however, the information collected this way is only useful if the program was compiled to share special knowledge of its internal structure with the debugger. Applied to an arbitrary program out-of-the-box, a stack trace can reveal where a program's stack frames are located, but nothing certain about their contents.

After the value of the ESP register for a program is stored in the EBP register for that program, the value of the program's EBP register points to the end of its current stack frame. Also (as in the example), the value stored in the stack from the EBP register also points to the cell which records the previous stack frame's EBP value, that is the stack frame used by the calling function and to which EBP would be restored when returning to the caller. That EBP value, in turn, will point to the cell which records the previous value of EBP, and so on in a continuous chain. As long as the chain is unbroken, WalkStack can walk backward through all the outstanding stack frames.

One way in which WalkStack could identify the cell containing the return address for the CallWndProc function is to look in the adjacent cell to each stored EBP value and see if the address of CallWndProcRet is stored there. In the example that EBP is stored in cell #47, adjacent to the return address in cell #46. This is extremely common, since most functions declare a stack frame immediately after being called, thereby recording EBP in the next cell after their caller's return address. This is not guaranteed, however, since the programmer or compiler might have decided to store other items on the stack before declaring a stack frame. Nevertheless, this technique would be adequate in most situations.

WalkStack avoids this limitation by deliberately overshooting the address of the next EBP and then looking to see if it overshot. Because Stack trace initially recorded the size of CallWndProc's stack frame as CallWinProcSize, it can go too far and look back by that distance to see if it can find CallWndProcRet.

Consider the stack shown below:

| | |
|---|---|
| 48 | ... |
| 47 | Previous EBP (points to cell #38) |
| 46 | "CallWndProcRet" return address |
| 45 | Parameter 1(Window Handle) |
| 44 | Parameter 2 (Message ID) |
| 43 | Parameter 3 (wParam) |
| 42 | Parameter 4 (1Param) |
| 41 | Stack Frame Cell #3 |
| 40 | Stack Frame Cell #2 |
| 39 | Stack Frame Cell #1 |
| 38 | Previous EBP |

In order to locate the CallwndProcRet address, WalkStack can walk the chain of EBP values and check the adjacent cells for the CallWndProcRet value, which it would find in cell #46 when it had traced to cell #47. If the return address was not stored in an adjacent cell to the EBP value, as previously discussed, this method would not work. To solve this problem, WalkStack looks back up the stack for the CallWndProcRet value. In this example, it would have to walk a little further to the EBP value which points to cell #38.

In doing this test, StackTrace remembers that its current location is cell 38. If the test fails, StackTrace will continue its search from that cell, not from the cell it examined in the test. To perform the test, StackTrace counts up the stack from cell 38, skipping the three cells it previously determined would be in the CallWndProc's stack frame, plus the four cells containing the parameters that the CallWndProc would have pushed onto the stack for the called function in the called function's stack, thereby examining cell 46 in this example. If the stack frame being examined is the function called by CallWndProc, the cell being examined will contain the value for value of CallWinProcRet, as its does in cell 46 in this example. If the stack frame is not the function called by CallWndProc, then StackTrace will not find the value of CallWinProcRet and will continue to walk through the stack from cell 38 searching for the value of CallWinProcRet in each subsequent stack tested.

When Stack trace initially located and recorded the value of CallWndProcRet for its later use, it also measures the distance from CallWndProcRet's position to the location of the previous EBP stack frame and named this value CallWndProcSize. WalkStack therefore needs only to add CallWndProcSize to the EBP value stored in the stack to ascertain the address of the CallWndProcRet regardless of the location of CallWndProcRet with reference to the location of EBP in the stack.

The WalkStack routine uses a function called JITDEBUG_Find_CallWndProcRet which contains the following statements:

```
DWORD WINAPI JITDEBUG_Find_CallWndProcRet
(
        const HANDLE    hProcess,
        const DWORD     dwCurrentEBP,
        const DWORD     dwBottomOfStack
)
{
        DWORD           dwResult = 0;
        DWORD           dwStackItem;
        DWORD           dwNewEBP = 0;
        // Start from current value of EBP
        dwStackItem = dwCurrentEBP;
        // Keep searching until we find a result, or we run
                out of stack
        while (!dwResult && dwStackItem > dwNewEBP &&
                dwStackItem < dwBottomOfStack)
        {
        // Current stack item contents become EBP
        dwNewEBP = dwStackItem;
        // Look to see if we've passed the CallWndProc return
                address.
        if (!ReadProcessMemory( g_JitData.hProcess,
                (LPCVOID) (dwNewEBP - g_JitData.dwStackFrameSize),
                (LPVOID) &dwStackItem, sizeof (dwStackItem, NULL
                ))
                return (0);
        // Is it a match?
        if (dwStackItem == g_JitData.dwCallWndProcRet)
        {
            // We've apparently located the return address to
                CallWndProc
            dwResult - dwNewEBP - g_JitData.dwStackFrameSize;
        }
        else
        {
            // Read the EBP value of the next stack frame
            if (!ReadProcessMemory( g_JitData.hProcess,
            (LPCVOID) dwNewEBP, (LPVOID) &dwStackItem,
            sizeof (dwStackItem), NULL ))
                return (0);
        }
        };
        return (dwResult);
}
```

The WalkStack routine requires the selected program's process handle, the value of the selected program's EBP register at the time of the program became unresponsive, and the location of the bottom of the selected program's stack to prevent WalkStack from running off the bottom of the selected program's stack if WalkStack can not find CallWndProcRet.

WalkStack function starts at the stack cell identified by the EBP register. It then looks backward (toward the "top") on the stack to see if it has overshot the CallWndProcRet value, which of course it has not yet because it has not gone anywhere yet. Since it has not found CallWndProcRet, the function then reads the value out of the stack cell indicated by the EBP register, which identifies another stack cell farther down the stack (toward the "bottom"). It repeats its search for CallWndProcRet and continues advancing down the stack until it either locates the cell containing CallWndProcRet or runs out of stack. WalkStack also quits if, for some reason, any of the links leads toward the top of the stack which is an illegal condition.

When the WalkStack succeeds, WalkStack returns a value identifying which stack cell contains CallWndProcRet.

D} SCANSTACK ROUTINE

If WalkStack could not locate CallWndProcRet because the chain stack frames was broken, StackTrace employ a ScanStack routine to search for it. ScanStack searches sequentially through the stack for the return value, working forward from the bottom of the stack. Because ScanStack searches forward from the beginning of the stack, ScanStack will find the first occurrence to CallWndProcRet, rather than the most recent. Frequently there is only one occurrence, so this yields the same result as "WalkStack" does above.

However, a window-procedure may have done something which caused it to be called again before it was finished (a re-entrant call), so there may be two or more outstanding occurrences of CallWndProcRet. Although Stack trace would prefer to use the most recent occurrence, only the earliest occurrence can be certified authentic by this method. If the more recent occurrence is not authentic, the program will suffer irreparable damage if Stack trace uses it. A decoy occurrences exist because the computer does not erase the stack memory when it is done using it. Each decoy started as an authentic return address, but it was left in the stack memory after a window-procedure function returned. A window-procedure for a pushbutton would get called re-entrantly, for example, when the user clicks on it with the mouse. The system calls the window-procedure with a message telling it the user has clicked the mouse, so the window-procedure changes its appearance to look depressed. That change could cause the window-procedure to implicitly call itself (via CallWndProc as usual) with a message asking it to redraw in the depressed state.

ScanStack works in the other direction than WalkStack, starting from the bottom of the stack and working toward the top until it finds CallWndProcRet.

```
ScanStack executes the following statements:
(
    const HANDLE        hProcess,
    const DWORD         dwCurrentESP,
    const DWORD         dwBottomOfStack
)
{
    DWORD               dwResult = 0;
    DWORD               adwBlock [64];
    UINT                iBlock;
    // ignore first entry in first "block"
    iBlock =0;
    while (!dwResult && dwBottom > dwCurrentSp)
    {
        // move to previous entry (if any)
        if (iBlock)
            iBlock.- -;
        else
        {
            // no previous entry, so load a set of 64 entries
            dwBottom -= sizeof (adwBlock);
            if (!ReadProcessMemory( g__JitData.hProcess,
(LPCVOID) dwBottom, (LPVOID) adwBlock,
sizeof (adwBlock), NULL ))
                return (0);
            // start at last entry in current block
            iBlock = 63;
        }
        // is the dispatch-function's return address in
        there?
        if (adwBlock [iBlock] == g__JitData.dwCallWndProcRet)
            dwResult = dwBottom + (4 * iBlock),
    }
    return (dwResult);
}
```

ScanStack reads 64 stack cells at a time into a temporary buffer and searches through it so Windows' ReadProcess-Memory function is not called to retrieve every single cell. ScanStack effectively starts at the bottom of the selected program's stack and searches each cell until it either finds CallWndProcRet or runs into the top of the stack, which is identified by the address in the selected program's ESP register.

D Creating a synthetic context for a program to resume

Upon discovering where CallWndProcRet resides on the program's stack, Stack trace adjusts the selected program's context (registers) to simulate the environment in which it would have eventually continued had the selected program not became unresponsive.

To do so, Stack trace must set the registers of the selected program so that the next instruction to be execute will be at CallWndProcRet.

CallWndProc expects the window-procedure to return a result value in the EAX register, but since CallWinProc does not examine the result code but merely records it, it is not critical what value Stack trace places there.

The ESP register is extremely critical because it controls the program's use of its stack. Therefore, Stack trace must set the ESP register so that the CallWndProc function can return to whomever called it. As discussed before, when a window-procedure function is returned, the ESP register for the selected program points to CallWndProcRet and is decremented as the system pops the CallWndProcRet cell and the following four cells off the stack. Since Stack trace has determined the address of the cell which contains CallWndProcRet, Stack trace calculates the value for the ESP register by subtracting five cells from the cell address that contains Call WndProcRet.

The value of the EBP register, likewise, is critical because it controls CallWndProc's access to its own storage, as well as pointing to the value of the previous stack frame. Stack trace derives the value for the EBP register by adding the value of CallWinProcSize to the value calculated for the ESP register above.

CallWndProc expected the EDI register to be preserved. In the 32-bit version of CallWndProc function the EDI register contains a copy of value in the ESP register. Stack Trace copy's the value calculated for the ESP register above into the EDI register. The 16-bit version, Win16 programs, of CallWndProc does not use the EDI register, therefore Stack trace need not address the EDI register for Win16 programs.

The value in the ESI register is not used after a return to CallWndProc, therefore Stack trace does not have to put any special value in the ESI register.

To obtain the foregoing, Stack trace performs the following statements:

```
Return__To__CallWndProc
(
    const HANDLE        hThread,
    const DWORD         dwStackCellOfCallWndProcRet
)
{
    CONTEXT             cntx;
    // Get current program registers
    GetThreadContext ( hThread, &cntx );
    // Adjust the execution context
    cntx.Esp = dwStackCellOfCallWndProcRet;
    cntx.Ebp = dwStackCellOfCallWndProcRet +
        g__JitData.dwStackFrameSize;
    cntx.Edi = cntx.Esp + 4;
    // Simulate the action a RET 10 would cause
    cntx.Eip = g__JitData.dwCallWndProcRet;
    cntx.Esp += 4 + 16;
    //Resume the program at the new context
    SetThreadContext ( hThread, &cntx );
}
```

Stack trace passes this function a handle to the selected program's thread, so Stack trace can examine and modify the selected program's registers, and the location of the stack cell which contains CallWndProcRet. The function retrieves the selected program's current register settings and sets them to the values they would have contained immediately after the program's window-procedure had returned normally.

The EBP (instruction pointer) register identifies the next instruction to execute, which will be at CallWndProcRet. The stack pointers point to the stack frame used by CallWndProc. When the function finishes, Stack trace can restart the selected program. The selected program will resume from within the CallWndProc function exactly as it would have if the program's window-procedure had finished what it was doing and returned normally.

At this point, Stack trace will close the Anti-Freeze.

While the above description teaches a preferred sequence of execution of the different routines comprising Anti-Freeze, various other sequences of execution of the different routines will also obtain the desired results. Further specific implementation for each routine has been set forth and it is well within the skill of the artisan in the art to generate other routines that perform the same function to obtain the same results. For example, once one has ascertained the return address and size of the CallWinProc function those values could be thereafter permanently stored in Anti-Freeze and recalled when needed rather than obtaining those value each time Stack trace is initiated. In doing this however the Stack trace may not work properly if the CallWinProc function is altered in later versions of the operating system.

Further for the Windows NT operating system the 16 Bit AddInstSet is folded into the AFHard routine which can be modified to determine if the selected program is a Win16 program and if so to direct the processing to the Win16 routines for AFSoft, StackTrace and the 16-bit AddInstSet.

While the invention has been particularly shown and described with references to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following.

What is claimed is:

1. An apparatus, operatively couplable to a data processing machine operating under control of a window type operating system, for making responsive a window function of a program operating under said operating system when said window function of said program becomes unresponsive to inputs from the keyboard and/or mouse, said operating system having previously assigned a plurality of registers, a virtual memory and a stack to said program for use by said program; said apparatus comprising:

a plurality of instruction means for instructing said data processing machine to perform operations, the plurality of instruction means including:

(a) first instruction means for instructing said data processing machine to provide an user interface for the selection of an unresponsive program;

(b) second instruction means for instructing said data processing machine after a selected program is selected by said user interface to determine whether said selected program is responsive to a message sent by said operating system to said program;

(c) third instruction means for instructing said data processing machine, when said second instruction means has determined that said selected program is responsive to said message, to determine whether said selected program has at least one disabled window and where said selected program has said at least one disabled window to enable one disabled window of said at least one disabled window; and (d) fourth instruction means for instructing said data processing machine, when said second instruction means has determined that said selected program is not responsive to said message, to modify said selected program to be responsive to messages sent to said selected program from said operating system.

2. The apparatus of claim 1 wherein said third instruction means instructs said data processing machine to construct a window tree for said selected program and to enable the lowest disabled window in said window tree.

3. The apparatus of claim 1 and 2 wherein said fourth instruction means instructs said data processing machine to establish said apparatus as the debugger for said program modify which suspends the operation a window function of said program.

4. The apparatus of claim 3 wherein said fourth instruction means instructs said data processing machine to search said stack for said program for the return address to a operating system call function that called said window function in said program and upon locating said return address to modify contents of a subset of said register to have the contents that said subset of registers would have had when said window function was successfully completed and for restarting said program such that said window function will immediately return said operating system call system which called said window function of said program so as to make responsive said program to messages from said operating system.

5. The apparatus of claim 3 wherein said fourth instruction means instructs said data processing machine to add additional memory space to said virtual memory, to store a routine in said additional memory space and to initiate said program at the start of said stored routine so as to make responsive said program to messages from said operating system.

6. The apparatus of claim 4 wherein said fourth means instruction means instructs said data processing machine to search said stack by a process of walking the stack.

7. The apparatus of claim 4 wherein said fourth means instruction means instructs said data processing machine to search said stack by a process of scanning the stack.

8. The apparatus of claim 4 wherein said fourth means instruction means instructs said data processing machine to first search said stack by a process of scanning the stack and when the process of scanning the stack fails to find said return address to then search said stack by a process of walking said stack.

9. The apparatus of claim 4 wherein said fourth means instruction means instructs said data processing machine to first search said stack by a process of walking the stack and when the process of walking the stack fails to find said return address to then search said stack by a process of scanning said stack.

10. A computer method for making responsive a program operating under a window type operating system when a window function of said program becomes unresponsive to inputs from the keyboard and/or mouse, said operating system having previously assigned a plurality of registers, a virtual memory and a stack to said program for use by said program; said computer method comprising the steps of:

(a) providing an user interface for the selection of an unresponsive program;

(b) sending a message from said operating system to a selected unresponsive program selected by said user interface;

(c) determining if said selected unresponsive program responded to said message sent by said operating system to said unresponsive selected program;

(d) determining if said selected unresponsive program has any disabled windows and if so enabling a disabled window when said selected unresponsive program responded to said message sent from said operating system; and (e) modifying said selected unresponsive program to be responsive to messages sent from said operating system to said selected unresponsive program when said selected unresponsive program did not respond to said message sent to said selected unresponsive program from said operating system.

11. The computer method of claim 10 wherein step (d) performs the steps of:

(d1) constructing a window tree for said selected program;

(d2) enabling the lowest disabled window in said window tree.

12. The computer method of claims 10 and 11 wherein step(e) performs the steps of:

(e1) establishing a debugger for said program which suspends the operation a window function of said program.

13. The computer method of claim 12 wherein step (e) performs the steps of:

(e2) searching said stack for said program for said return address to said operating system call function that called said window function in said program;

(e3) upon locating said return address modifying contents of a subset of said register to have those contents that said subset of registers would have had when said window function was successfully completed; and (e4) restarting said program such that said window function will immediately return to said operating system call function which called said window function of said program so as to make responsive said program to messages from said operating system.

14. The apparatus of claim 12 wherein step (e) performs the steps of:

(e4) adding additional memory space to said virtual memory;

(e5) storing a routine in said additional memory space; and (e6) restarting said program at the start of said stored routine so as to make said program responsive to messages from said operating system.

15. The apparatus of claim 13 wherein step (e2) includes the steps of:

(i) searching said stack by a process of walking the stack.

16. The apparatus of claim 13 wherein step (e2) includes the steps of:

(ii) searching said stack by a process of scanning the stack.

17. The apparatus of claim 13 wherein step (e2) includes the steps of:

(iii) searching said stack by a process of walking the stack; and (iv) searching said stack by a process of scanning said stack when the process of walking the stack fails to find said return address.

18. The apparatus of claim 13 wherein step (e2) includes the steps of:

(v) searching said stack by a process of scanning the stack; and (vi) searching said stack by a process of walking the stack when the process of scanning walking the stack fails to find said return address.

* * * * *

UNITED STATES PATENT AND TRADEMARK OFFICE
CERTIFICATE OF CORRECTION

PATENT NO. : 5,911,060
DATED : June 8, 1999
INVENTOR(S) : Scott Elliott

It is certified that error appears in the above-indentified patent and that said Letters Patent is hereby corrected as shown below:

Column 5, line 18, "II AFA" should be --II AFApp--.
Column 6, line 39, before "ii)" delete "p3".
Column 16, line 27, "dwResult - dwNewEBP" should be
    --dwResult = dwNewEBP--.

Signed and Sealed this

Eighth Day of February, 2000

Attest:

Attesting Officer

Q. TODD DICKINSON

Commissioner of Patents and Trademarks